Figure 1:
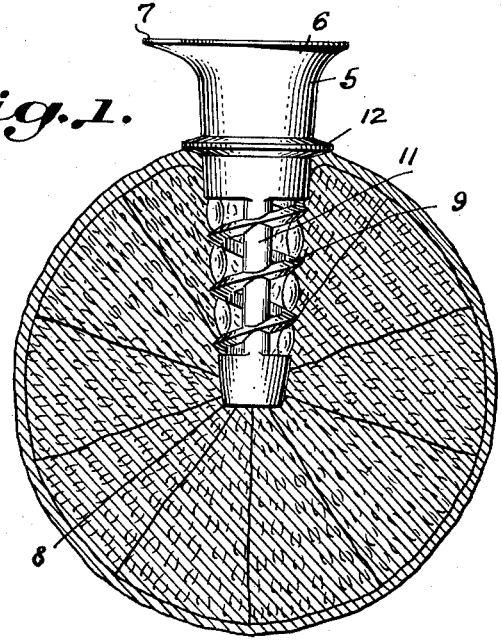

Dec. 18, 1951     D. C. COMOTTO     2,579,032

FRUIT JUICE EXTRACTOR

Filed Aug. 15, 1949

INVENTOR
Daniel C. Comotto,

BY Russell E. Pattison.

ATTORNEY

Patented Dec. 18, 1951

2,579,032

UNITED STATES PATENT OFFICE 2,579,032

FRUIT JUICE EXTRACTOR

Daniel C. Comotto, Washington, D. C.

Application August 15, 1949, Serial No. 110,399

2 Claims. (Cl. 100—49)

This invention is a fruit juice extractor, adapted particularly for use in removing the juice from such fruits as oranges, lemons, grapefruit, etc.

The primary object of the invention is to provide a juice extractor of simple and inexpensive construction which may be easily and quickly inserted in the fruit to provide a combined receptacle and channel into which the juice may flow in the extracting process.

A further object of the invention is to provide a juice extractor constructed in one piece so as to have no movable or separable parts, and which is constructed in such manner that free access may be had to all parts of the extractor in order that the latter may be easily cleaned and maintained in a sanitary manner.

A further object of the invention is to provide an extractor of that type embodying a hollow sleeve to be inserted into the body of the fruit, and wherein the construction of the sleeve is such as to preclude the possibility of seeds, pulp and other matter becoming clogged in the sleeve openings to impair the free flow of juice therethrough.

With the foregoing objects in view, together with others which will appear as the description proceeds, the invention consists in the novel construction, combination and arrangement of parts, all of which will be described more fully hereinafter, illustrated in the drawing, and particularly pointed out in the claims.

In the drawings—

Figure 2:
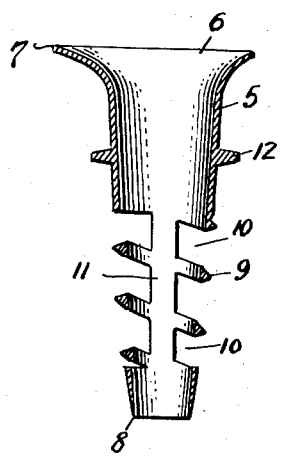
Figure 3:
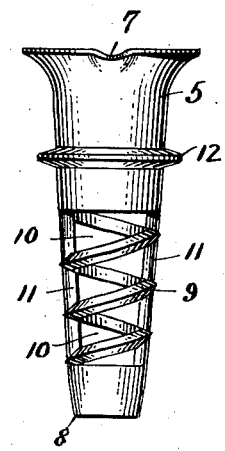
Figure 4:
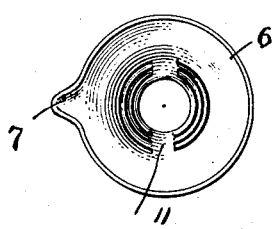

Fig. 1 is a sectional view taken through the body of a citrus fruit and showing in side elevation the application thereto of an extractor embodying the invention, Fig. 2 is a vertical longitudinal sectional view taken through the body of the extractor, Fig. 3 is a side elevation of the extractor, and Fig. 4 is a top plan view of the device shown in Fig. 3.

Referring now more particularly to the drawing, the body of the extractor is indicated at 5 and comprises a hollow sleeve, open at both ends, and tapering slightly from the outer to the inner end. This body is formed of light, inexpensive metal, and the outer end is enlarged or flared as at 6 to constitute a bowl portion having a pouring lip 7. The opposite or restricted end of the sleeve has its edges reduced or sharpened to provide a cutting edge 8.

The sleeve is provided with a relatively steep pitch thread indicated at 9. This thread is cut from the side wall of the sleeve so as to leave a sinuous opening 10 throughout the extent of the thread. Portions of the sleeve, however, remain intact so as to provide strengthening or reenforcing arms 11. In the present instance, these arms are provided at diametrically opposite points in the sleeve body, so that these arms are integral not only with portions of the thread 9 but also with the body of the sleeve. It is preferred that the distance 10 between threads of the sleeve be relatively narrow so as to be equal to or less than the transverse dimension of seeds with which the extractor is to be used. As will be seen in Figs. 2 and 3, the cutting edge of the thread 9 intersects the bars 11 and extends outwardly beyond the outer surface of said bars.

The body of the sleeve 5 is provided with an integral annular flange 12 disposed on the body below the bowl portion 6. This flange acts as a limiting stop to prevent the sleeve entering too far into the body of the fruit.

It is noted that the thread 9 in the sleeve wall begins a substantial distance inwardly from the lower or cutting edge of the sleeve and terminates slightly beyond the medial portion of the sleeve. By so locating the thread, ample threading for the purposes of the extractor are provided without unnecessarily weakening the body of the implement.

In use, the sleeve will be forced into the body of the fruit preferably along the core line and parallel with the latter. This may be easily done by applying rotative action to the sleeve while the cutting edge 8 is applied to the surface of the fruit. As rotative and longitudinal pressures are applied to the sleeve, the thread will take hold of the skin and pulp portions of the fruit so that the sleeve will penetrate into the body of the fruit a distance to be limited by engagement of the stop flange 12 with the outer surface of the fruit as shown in Fig. 1.

With the implement thus applied, the squeezing action upon the body of the fruit will cause the juice thereof to flow through the spaces 10 and to the interior of the hollow sleeve from which it may be poured by the pouring lip 7. By spacing the thread in the manner stated, seeds within the fruit will be prevented from entering between threads. After all of the juice has been extracted, retrograde rotation of the body of the sleeve will cause the latter to move outwardly, leaving behind any core or pulp which may have collected within the sleeve.

From the foregoing it is apparent that I have provided a juice extractor of extremely simple and inexpensive construction, which may be applied to the fruit without the exercise of special skill or knowledge, which limits itself against excessive penetration into the body of the fruit and which will prove thoroughly effective in accomplishing its purposes. The thread constructed in the manner indicated assures a strong structure, and yet one wherein all parts are readily accessible in order that the extractor may be maintained at all times in a clean and sanitary manner.

I claim:

1. A juice extractor comprising a tapered hollow sleeve having an upper, enlarged end wall portion and a lower, restricted end wall portion spaced from said upper end wall portion, the lower edge of the lower end wall portion being provided with a cutting edge, the upper and lower end wall portions being connected by spaced bars, and the said portions and bars being also interconnected by a helical cutting thread, said thread having a cutting edge on the outer face thereof, said helical thread intersecting said bars.

2. A juice extractor according to claim 1, in which the cutting edge of the thread extends outwardly beyond the outer surface of the bars.

DANIEL C. COMOTTO.

REFERENCES CITED

The following references are of record in the file of this patent:

UNITED STATES PATENTS

| Number | Name | Date |
|---|---|---|
| 1,649,755 | Thompson | Nov. 15, 1927 |

FOREIGN PATENTS

| Number | Country | Date |
|---|---|---|
| 189,364 | Switzerland | Feb. 28, 1937 |
| 240,955 | Switzerland | July 16, 1946 |
| 518,798 | Great Britain | Mar. 7, 1940 |
| 660,153 | Germany | May 18, 1938 |